United States Patent
Kopetz et al.

(10) Patent No.: US 7,124,316 B2
(45) Date of Patent: Oct. 17, 2006

(54) HANDLING ERRORS IN AN ERROR-TOLERANT DISTRIBUTED COMPUTER SYSTEM

(75) Inventors: Hermann Kopetz, Baden-Siegenfeld (AT); Günther Bauer, Petzenkirchen (AT)

(73) Assignee: FTS Computertechnik GES m.b.H., Baden-Siegenfeld (AT)

( * ) Notice: Subject to any disclaimer, the term of this patent is extended or adjusted under 35 U.S.C. 154(b) by 600 days.

(21) Appl. No.: 10/398,560

(22) PCT Filed: Oct. 8, 2001

(86) PCT No.: PCT/AT01/00322

§ 371 (c)(1),
(2), (4) Date: Aug. 13, 2003

(87) PCT Pub. No.: WO02/31656

PCT Pub. Date: Apr. 18, 2002

(65) Prior Publication Data

US 2004/0030949 A1    Feb. 12, 2004

(30) Foreign Application Priority Data

Oct. 10, 2000   (AT)  .................................. A1723/00

(51) Int. Cl.
*G06F 11/00* (2006.01)
(52) U.S. Cl. .......................................... 714/2; 714/700
(58) Field of Classification Search .............. 714/2, 714/700
See application file for complete search history.

(56) References Cited

U.S. PATENT DOCUMENTS

| | | | |
|---|---|---|---|
| 5,694,542 A | 12/1997 | Kopetz | |
| 5,754,555 A * | 5/1998 | Hurme et al. | 370/522 |
| 6,353,615 B1 * | 3/2002 | Bohne | 370/442 |
| 6,467,003 B1 * | 10/2002 | Doerenberg et al. | 710/117 |
| 2002/0018446 A1 * | 2/2002 | Huh et al. | 370/245 |
| 2003/0063583 A1 * | 4/2003 | Padovani et al. | 370/329 |

(Continued)

FOREIGN PATENT DOCUMENTS

| | | |
|---|---|---|
| EP | 0 662 712 A2 | 11/1994 |
| WO | WO 01/13230 A1 | 2/2001 |

OTHER PUBLICATIONS

H. Kopetz, "Real-Time Systems: Design Principles for Distributed Embedded Applications," *Kluwer Academic Publishers*, Boston, ISN: 0-7923-9894-7, pp. 58-61, 130-133 (1997).

(Continued)

*Primary Examiner*—Bryce P. Bonzo
(74) *Attorney, Agent, or Firm*—Finnegan, Henderson, Farabow, Garrett & Dunner, L.L.P.

(57) ABSTRACT

Method of dealing with faults in a fault-tolerant distributed computer system, as well as such a system, with a plurality of node computers (K1 . . . K4) which are connected by means of communication channels (c11 . . . c42) and access to the channels takes place according to a cyclic time slicing method. Messages leaving node computers (K1 . . . K4) are checked by independently formed guardians (GUA) which convert a message burdened with an SOS ("slightly off specification") fault either into a correct message or into a message which can be recognised by all node computers as clearly incorrect.

11 Claims, 1 Drawing Sheet

U.S. PATENT DOCUMENTS

2003/0156594 A1* 8/2003 Trott et al. .......... 370/442
2004/0163120 A1* 8/2004 Rabenko et al. ......... 725/111

OTHER PUBLICATIONS

H. Kopetz, et al. "Tolerating Arbitrary Node Failures in the Time-Triggered Architecture," Society of Automotive Engineers, Inc., pp. 1-7 (Mar. 2001).

H. Kopetz and D. Millinger, "The Transparent Implementation of Fault Tolerance in the Time-Triggered and Architecture," Dependable Computing for Critical Applications 7, V12, 1999, p. 192-206.

H. Kopetz and K.H. Kim, "Temporal Uncertainties in Interactions among Real-Time Objects," Ninth Symposium on Reliable Distributed Systems (Proceedings), pp. 165-174 (Oct. 1990).

* cited by examiner

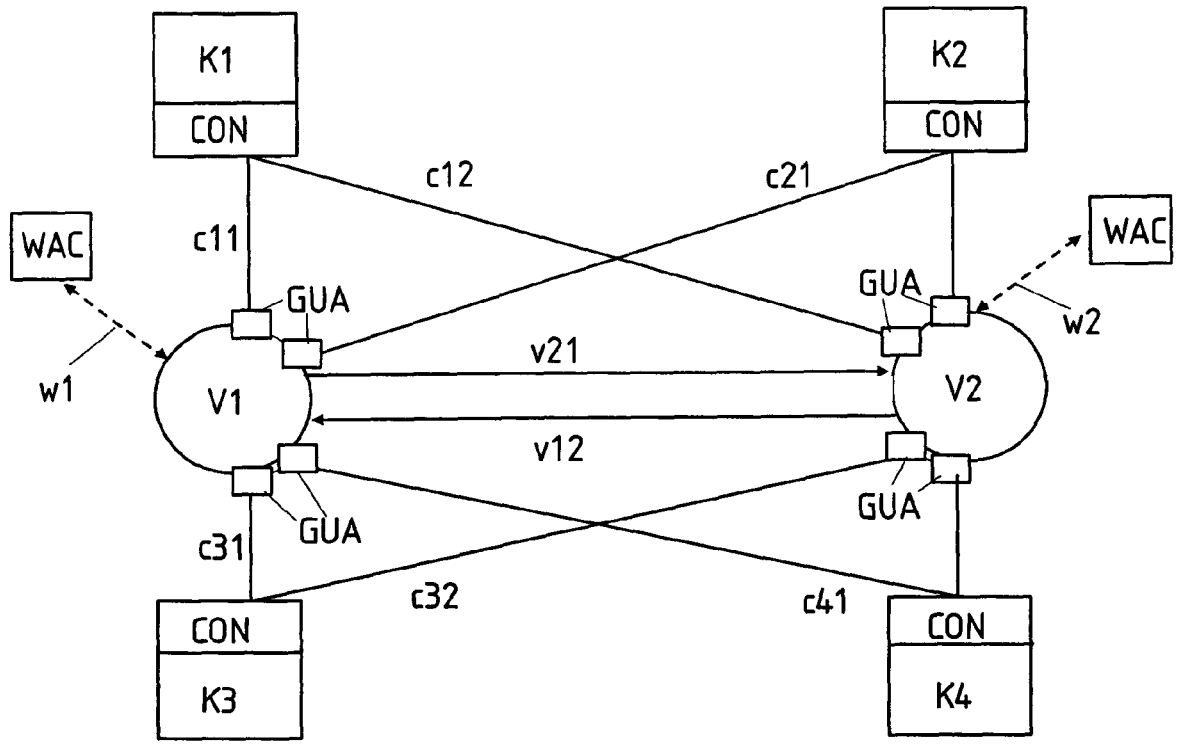
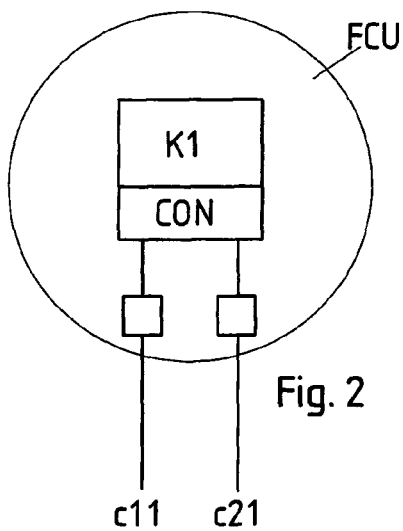
Fig. 2
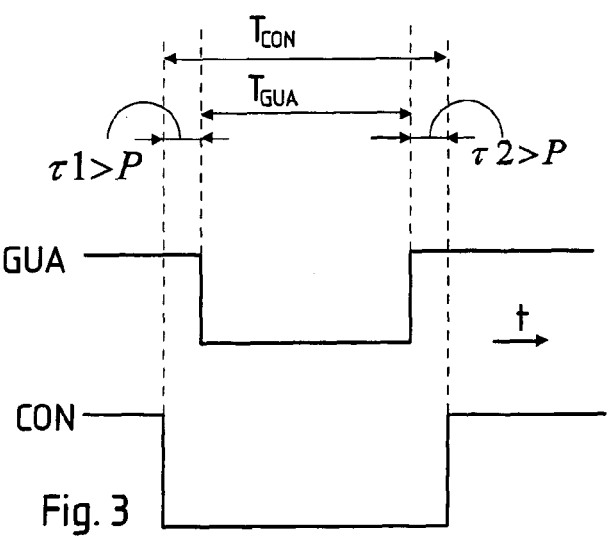
Fig. 3
Fig. 1

HANDLING ERRORS IN AN ERROR-TOLERANT DISTRIBUTED COMPUTER SYSTEM

The invention relates to a method of dealing with faults in a fault-tolerant distributed computer system with a plurality of node computers which are connected by means of communication channels and each node computer has an autonomous communication control unit wherein access to the communication channels takes place according to a cyclic time slicing method and the correctness of messages leaving the node computers is checked by guardians.

Likewise the invention refers to a fault-tolerant distributed computer system with a plurality of node computers which are connected to each other by means of at least of one distributor unit and communication channels wherein each node computer has an autonomous communication control unit, access to the communication channels takes place according to a cyclic time slicing method and guardians are provided for the purpose of checking the messages leaving node computers.

Technical applications which are critical in terms of security, that is to say applications where a fault can lead to a disaster, are increasingly led by distributed fault-tolerant real-time computer systems.

In a distributed fault-tolerant real-time computer system comprising a number of node computers and a real-time communication system each individual breakdown of a node computer will be tolerated. In the core of such computer architecture there is a fault-tolerant real-time communication system for the predictably fast and secure exchange of messages.

A communication protocol which fulfils these requirements is described in EP 0658 257 corresponding to U.S. Pat. No. 5,694,542. The protocol has become known under the name "Time-Triggered Protokoll/C (TTP/C)" and is also disclosed in Kopetz, H. (1997) *Real-Time Systems, Design Principles for Distributed Embedded Applications*; ISBN: 0-7923-9894-7, Boston, Kluwer Academic Publishers. It is based upon the known cyclic time slicing method (TDMA: time-division multiple access) with a priori fixed time slices. TTP/C uses a method of fault-tolerant clock synchronisation which is disclosed in U.S. Pat. No. 4,866,606.

TTP/C presupposes that the communication system supports a logical broadcast topology and that the node computers display fail-silence breakdown behaviour, i.e. either the node computers function correctly in the value domain and in the time domain or they are quiet. The prevention of faults in the time domain, that is to say the so-called "babbling idiot" faults, is achieved in TTP/C by an independent fault recognition unit, called a "bus guardian" there, which has an independent time basis and continuously checks the time behaviour of the node computer. In order to realise the fault tolerance several fail-silent node computers are brought together to form a fault-tolerant unit (FTU) and the communication system is replicated. So long as a node computer of an FTU and a replica of the communication system function the services of the FTUs are provided punctually in the time domain and value domain.

A logical broadcast topology of the communication can be physically constructed either through a distributed bus system, a distributed ring system or through a central distributor unit (e.g. a star coupler) with point-to-point connections to the node computers. If a distributed bus system or a distributed ring system is constructed each node computer must have its own bus guardian. If on the other hand a central distributor unit is used all guardians can be integrated into this distributor unit which due to the global observation of the behaviour of all nodes can effectively force regular sending behaviour in the time domain. This is described in the subsequently published WO 01/13230 A1.

In a distributed computer system faults which can lead to an inconsistent state of the system are particularly critical. As an example a so-called brake-by-wire application in a motor car is cited here wherein a central brake computer sends brake messages to four wheel computers in the wheels. If a brake message is correctly received by two wheel computers and the other two wheel computers do not receive the message an inconsistent state arises. If braking of two wheels which are on the same side of the vehicle takes place the vehicle can go out of control. The type of fault described here is referred to in literature as a Byzantine fault (Kopetz, p. 60, p. 133). The fast recognition and correct handling of Byzantine faults is one of the most difficult problems in computing.

A sub-class of Byzantine faults is formed by the "slightly-off-specification" faults (in short SOS faults). An SOS fault can occur on the interface between analog technology and digital technology. In the present specialised area "digital signals" are understood to be logical signals but "analog signals" are understood to be all physical signals. The distinction between analog and digital technology is also to be understood here in this sense. In the realisation of a data transfer each logical bit can be represented on the line by a signal value (e.g. voltage from a specified voltage tolerance interval) during a specified interval of time. A correct sender must generate its analog signals within the specified tolerance intervals in order to ensure that all correct recipients also correctly interpret these signals. If a sender of a message generates a signal slightly (slightly-off-specification) outside of the specified interval (in the value domain, in the time domain or in both) the case can arise wherein a few recipients correctly interpret this signal while other recipients cannot interpret the signal correctly. We refer to such a broadcast message as SOS-false. Subsequently a Byzantine fault, as described above with reference to a brake system, can occur. Such a fault can be caused by a defective voltage supply, a defective clock or a component which has deteriorated through ageing. The transfer of a message to two communication channels cannot prevent SOS faults if the reason for the fault, e.g. a defective clock of the computer node which generates the bit sequence, affects both channels.

It is a principle of security technology to recognise errors arising at the earliest possible point in time in order to be able to take counter-measures before subsequent faults cause further damage. This principle is complied with in the said TTP/C protocol (EP 0 658 257) in that SOS faults are consistently recognised by means of the so-called membership algorithm of the TTP/C protocol within a maximum of two TDMA rounds. As SOS faults typically consist of very rarely occurring transient faults, SOS faults of the virtually coincident multiple faults which are also a very rarely occurring class are assigned in an existing prototype implementation of TTP/C and handled as such.

It is object of the invention to facilitate toleration of faults of the SOS class in a distributed computer system through appropriate measures.

This object is achieved with a method of the type mentioned at the outset wherein according to the invention the independently formed guardians convert a message burdened with an SOS ("slightly off specifications") fault either into a correct message or into a message which can be recognised by all receiving node computers as clearly incorrect.

The object is also achieved with a fault-tolerant distributed computer system of the type indicated above wherein according to the invention the independently formed guardians are adapted to convert a message burdened with an SOS ("slightly off specifications") fault either into a correct message or into a message which can be recognised by all receiving node computers as clearly incorrect.

Thanks to the invention the fault category of "slightly off specification" (SOS) faults can also be tolerated in a time-controlled, distributed, fault-tolerant architecture for highly reliable real-time computer applications.

In an advantageous embodiment it is provided that each independent guardian with the support of its independent time basis checks whether the start of a message sent by the communication control unit of a node computer falls within the start time window of the message which is known a priori to the guardian and which immediately closes the corresponding communication channel if the message lies outside of this time window in order that an incomplete message which can be recognised by all receiving node computers as incorrect is produced. In this way the occurrence of only slightly distorted messages which may be wrongly interpreted by the recipients as correct can be prevented.

Furthermore it is useful if a guardian regenerates the incoming physical signal of each message in the time domain and value domain taking into consideration the relevant coding regulations and using its local time basis and its local power supply. Such an independent regeneration considerably increases the required security of the system.

Another advantageous embodiment of the invention provides that a guardian not receiving any messages generates no messages with correct CRC and correct length. This measure can also further increase the security of the system.

Optimum control on the basis of the start time window provides that the start time window of a guardian begins by more than the precision of the system after the start time window of a node computer and the start time window of a guardian ends by more than the precision before the start time window of a node computer.

Additional advantages not only in relation to security but also with regard to the realisation costs of the system ensue if the guardians are integrated into the distributor unit, of which there is at least one, and the distributor unit has an independent power supply and independent fault-tolerant distributed clock synchronisation.

The invention together with further advantages is described in greater detail below by reference to example embodiments which are illustrated in the drawings. The latter show:

FIG. 1 schematically a distributed computer system comprising four node computers which are connected to each other by means of two replicated central distributor units, FIG. 2 a Fault Containment Unit formed by a node computer and two guardians and FIG. 3 the position of the start time window of a guardian and a node computer.

FIG. 1 shows a system of four node computers K1, K2, K3, K4 wherein each node computer forms an exchangeable unit and is connected with a point-to-point connection or communication channel c11 . . . c42 to one of two replicated central distributor units V1 or V2. Between each output of a node computer and each input of the distributor unit there is a guardian GUA which is either designed to be independent or can be integrated into the distributor unit. The principle function of a guardian or bus guardian is explained in Kopetz, p. 173. In order to be able to fulfil its function a guardian also requires, besides a controller, switches in order to open or lock channels. Two unidirectional communication channels v21, v12 between the distributor units V1 and V2 serve for the reciprocal monitoring and the information exchange of the central distributor units V1 and V2. As also ensues from Kopetz, e.g. p. 172–177, each node computer K1 . . . K4 has an autonomous controller CON or communication controller which is connected to the replicated communication channels, e.g. c11, c12. Indicated connections w1, w2 are dedicated communication channels. They lead to service computers w1, w2 which can monitor the parameters of the distributor units and the correct functions of the same.

FIG. 2 shows a node computer K1 with its communication controller CON and the communication channels c11, c21 to the other node computers or distributor units of the distributed computer system. The guardians GUA are provided as bus guardians here for the communication channels c11, c21 but they can be integrated into the two independent central distributor units V1, V2 according to FIG. 1. From a logical viewpoint the three sub-systems node computer+two guardians form a unit which is referred to here as a "Fault Containment Unit" (FCU) and is indicated in this way in FIG. 2. As stated, this is independently of whether the guardians GUA are physically integrated into the central distributor units or into the node computers.

Reference is now made to FIG. 3, in which start time windows for the start of a message are included. A distinction is made between the start window $T_{CON}$ with precisely this length $T_{CON}$ of a node computer or its controller and the start time window $T_{GUA}$ of a guardian. The invention provides that the time window $T_{GUA}$ of a guardian is shorter than the time window $T_{CON}$ of a node computer and between the time window $T_{GUA}$ embedded in the window $T_{CON}$ there is an interval t1/t2 which is greater than the precision P of the system. The concept of precision is clarified e.g. in Kopetz, Chapter 3.1.3 "Precision and Accuracy", p. 49 and 50.

We refer to a given fault of an active sub-system, e.g. of the node computer K1, as unconstrained active. Furthermore we refer to a fault of a passive sub-system, e.g. of a guardian or of a connection c11 or c22 as unconstrained passive if it is ensured through the construction of the passive sub-system that this sub-system cannot generate a bit sequence from itself, i.e. without input from an active sub-system, which can be interpreted by a recipient as a syntactically correct message. A message is syntactically correct if a CRC check does not indicate any faults, it has the correct length, corresponds to the coding regulations and arrives within the expected interval of time.

If a passive sub-system does not have the knowledge of how to generate a correct CRC (has no access to the CRC generation algorithm) and how long a correct message must be, on the basis of statistical random processes (disturbances) the probability of a syntactically correct message being produced is negligibly low.

A Fault Containment Unit FCU can convert an unconstrained active fault of a node computer K1 or an unconstrained passive fault of one of the two guardians GUA into a fault which is not a Byzantine fault if the following assumptions are fulfilled:

(i) a correct node computer K1 sends the same syntactically correct message on both channels c11 and c12 and (ii) a correct guardian GUA converts an SOS-false message from the node computer K1 either into a syntactically correct message or into a message which can be recognised as clearly incorrect by all recipients (non-SOS message) and (iii) during the sending of a message a maximum of one of the indicated sub-systems is defective.

Due to the fault assumption (iii) only a single one of the three indicated sub-systems K1, GUA, GUA can be defective. If the node computer K1 is unconstrained defective both the guardians GUA and GUA are not defective and generate according to assumption (ii) non-SOS messages. If one of the two guardians GUA is unconstrained passive defective the node computer K1 generates a syntactically correct message and transfers this syntactically correct message to both guardians GUA (assumption i). The correct guardian GUA then transfers the message correctly to all recipients, i.e. node computers. Due to the reception logic and the self-reliance principle of the TTP/C protocol in this case all the correct recipients will select the correct message and classify the sending node computer as correct. In order to tolerate SOS faults no change in the TTP/C protocol is necessary.

A given message can be SOS-false for the following three reasons:

(i) the message has an SOS-fault in the value domain and/or (ii) the message has an inner SOS fault in the time domain (e.g. timing fault within the code) and/or (iii) the transfer of the message is begun slightly outside of the specified sending interval (see FIG. 3).

A correct guardian (GUA) converts these reasons for faults as follows into non-SOS faults:

(i) The output values of the message are regenerated by a guardian GUA with the independent voltage supply of the guardian.

(ii) The coding of the message is regenerated by a guardian GUA with the independent time basis of the bus guardian.

(iii) The guardian locks the channel as soon as it recognises that the transfer has begun outside of the specified interval of time $T_{GUA}$. All recipients, i.e. node computers, therefore receive greatly distorted messages which are recognised as defective.

A locking of the channel by a guardian GUA directly after the specified end of the transfer time of a message is generally not sufficient to prevent SOS-faults as it is not excluded that a message which is slightly distorted through the locking can be a trigger for an SOS-fault of a guardian GUA which is fault-free in itself. If both guardians slightly distort the message in the same way an SOS-fault can arise at system level.

Finally it is emphasised that this invention is not limited to the realisation described with four node computers but can be expanded as desired. It can be used not only with the TTP/C protocol but also with other time-controlled protocols.

The invention claimed is:

1. A method of dealing with faults in a fault-tolerant distributed computer system with a plurality of node computers which are connected by means of communication channels and each node computer has an autonomous communication control unit wherein access to the communication channels takes place according to a cyclic time slicing method and a correctness of messages having the node computers is checked by guardians and characterized in that independently formed guardians convert a message burdened with an SOS ("slightly off specifications") fault either into a correct message or into a message which can be recognized by all receiving node computers as clearly incorrect.

2. The method according to claim 1 characterized in that each independent guardian with a support of its independent time basis checks whether a start of a message sent by the communication control unit of a node computer falls within a start time window of the message known a priori to the guardian and which immediately closes the corresponding communication channel if the message lies outside of this time window in order that an incomplete message which can be recognized by all receiving node computers as incorrect is formed.

3. The method according to claim 2 characterized in that the start time window of the guardian starts by more than a precision of a system after a start time window of a cost computer and the start time window of the guardian ends by more than the precision before a start time window of a node computer.

4. The method according to claim 1 characterized in that a guardian regenerates an incoming physical signal of each message in a time domain and a value domain taking into consideration relevant coding regulations and using its local time basis and its local power supply.

5. The method according to claim 1 characterized in that a guardian not receiving any messages does not generate any messages with a correct CRC and a correct length.

6. A fault-tolerant distributed computer system with a plurality of node computers which are connected to each other by at least one distributor unit and communication channels, each node computer has an autonomous communication control unit, access to the communication channels takes place according to a cyclic time slicing method and guardians are provided for a purpose of checking messages leaving the node computers characterized in that independently formed guardians are adapted to convert a message burdened with an SOS ("slightly off specifications") fault either into a correct message or into a message which can be recognised by all receiving node computers as clearly incorrect.

7. The computer system according to claim 6 characterized in that a guardian has an independent time basis and is adapted to check whether a start of a message sent by the communication control unit of a node computer falls within a start time window of the message known a priority a guardian as well as to immediately close the corresponding communication channel if the message lies outside of this time window in order that an incomplete message is formed which can be recognized by all receiving node computers as incorrect.

8. The computer system according to claim 6 characterized in that a guardian is adapted to regenerate an incoming physical signal of each message in a time domain and a value domain taking into consideration relevant coding regulations and using its local time basis and its local power supply.

9. The computer system according to claim 6 characterized in that a guardian is adapted, in an event of its not receiving a message, to not generate any messages with correct CRC and correct length.

10. The computer system according to claim 6 characterized in that a beginning of a start time window of a node computer lies by more than a precision of a system before a beginning of a start time window of a guardian and an end of the start time window of a guardian lies by more than a precision before the end of a start time window of a cost computer.

11. The computer system according to claim 6 characterized in that the guardians are integrated into the distributor unit, of which there is at least one, and the distributor unit has an independent power supply and independent fault-tolerant distributed clock synchronization.

* * * * *

UNITED STATES PATENT AND TRADEMARK OFFICE
CERTIFICATE OF CORRECTION

PATENT NO.        : 7,124,316 B2
APPLICATION NO. : 10/398560
DATED             : October 17, 2006
INVENTOR(S)       : Hermann Kopetz et al.

It is certified that error appears in the above-identified patent and that said Letters Patent is hereby corrected as shown below:

On the title page, item (73), line 1, "GES m.b.H.," should read --Ges.m.b.H.,--.

On the title page, item (57), line 10, "recognised" should read --recognized--.

In claim 6, column 6, line 30, "recognised" should read --recognized--.

In claim 7, column 6, line 36, "a priority" should read --*a priori* to the--.

Signed and Sealed this

Ninth Day of January, 2007

JON W. DUDAS
*Director of the United States Patent and Trademark Office*